UNITED STATES PATENT OFFICE.

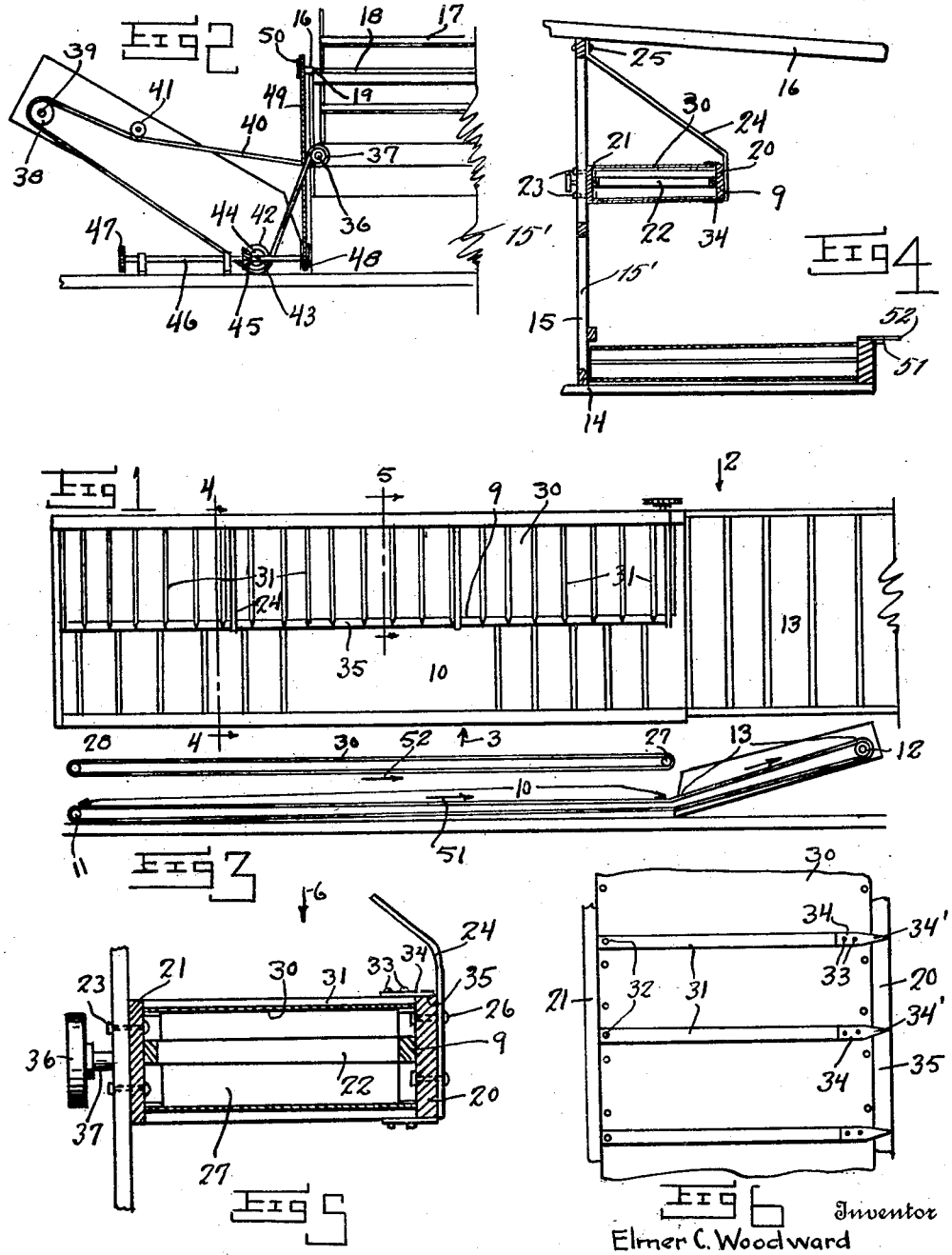

ELMER C. WOODWARD, OF HATTON, WASHINGTON.

FEED DEVICE FOR HARVESTING-MACHINES AND THE LIKE.

1,275,639.  Specification of Letters Patent.  Patented Aug. 13, 1918.

Application filed November 11, 1916, Serial No. 130,881. Renewed June 17, 1918. Serial No. 240,564.

*To all whom it may concern:*

Be it known that I, ELMER C. WOODWARD, a citizen of the United States, residing at Hatton, in the county of Adams and State of Washington, have invented a new and useful Feed Device for Harvesting-Machines and the like, of which the following is a specification.

My invention relates to improvements in feed devices for harvesting machines and has for its principal object to compress cut mustard and weeds so that they may be elevated from harvesting machine platforms to wagon or threshing machines.

Another object of the invention is to provide an elevator feed device which shall carry away light, bulky weeds as soon as they are cut, thus keeping the machine clear and in condition to do continual cutting.

A still further object is to provide a device of the class described which shall be simple of construction but very effective in use.

Other objects and features of novelty of the invention will be more fully described in connection with the accompanying specification and claimed in the appended claims.

In the drawings:

Figure 1 is a plan view of a header platform and an elevator showing my device attached.

Fig. 2 is a view looking in the direction of arrow 2 of Fig. 1.

Fig. 3 is a diagrammatical view looking in the direction of arrow 3 of Fig. 1 showing the arrangement of my device in connection with a platform draper and elevator.

Fig. 4 is an enlarged sectional view taken on line 4—4 of Fig. 1.

Fig. 5 is an enlarged sectional view taken on line 5—5 of Fig. 1.

Fig. 6 is a view looking in the direction of arrow 6 of Fig. 5.

Like numerals designate the same parts throughout the various figures of the drawings.

At 10 I have indicated a harvesting machine platform draper which is trained about roller 11 and then around roller 12 to form the elevator 13. Secured to the back of platform frame 14 is the upright screen support 15 extending along the back of draper 10 and supporting the reel carrying arms 16. A screen 15' is attached to screen support 15. A reciprocating cutter bar, upon which are mounted cutters 52, is shown at 51. The reel is indicated at 17 and is mounted on shaft 18 which is journaled on arms 16 at 19.

A draper frame 9 consisting of front and rear boards 20 and 21, spaced apart by cross pieces 22, is fastened to the screen frame 15 by bolts 23. Braces 24, fastened by bolts 25 to screen 15 and to board 20 by bolts 26, served to assist in supporting draper 9. It will be noted that draper frame 9 is substantially parallel with platform draper 10 and extends the entire length thereof.

Rollers 27 and 28 are mounted at opposite extremities of frame 9 and over them is trained the secondary draper 30.

Cleats 31 are secured to draper 30 by means of rivets 32 and served to aid in compressing and dragging light weeds to elevator 13.

Secured to cleats 31 by means of fastening bolts 33 are clips 34, the free ends of which are pointed as at 34' and extend over and are adapted to scrape the edge 35 of board 20. The clips 34 will serve principally to catch the cut grain and weeds that are cast onto the upper face of draper 30 or start to crowd up thereon and to carry them around until they may be dropped upon draper 10 and thence be carried to elevator 13. The clips 34 will also serve to scrape the edge 35 clean and prevent any cut material from dropping over the sideboard 20 between the opposing faces of draper 30.

In Fig. 2 I have shown a pulley 36 secured to shaft 37 upon which roller 27 is mounted. Pulley 38 is secured on shaft 39 upon which roller 12 is mounted. A belt 40 is trained over pulleys 36 and 38, idler 41 and pulley 42. Pulley 42 is mounted on shaft 43 which also carries bevel gear 44. Gear 44 meshes with bevel gear 45 which is keyed or otherwise secured to drive shaft 46. Shaft 46 carries drive gear 47 and sprocket 48. A chain 49 is trained over sprocket 48 and sprocket 50, sprocket 50 being secured to the reel shaft 18. When drive gear 47 is revolved in a clockwise direction with respect to Fig. 4 by any of the well-known means used in connection with harvesting drives it will be seen that reel 17 will revolve in such a direction as to throw grain and weeds cut by the cutters 52 between drapers 10 and 30 and back against screen 15', and that due to the manner in which belt 40 is trained over pulleys 42, 36, and 38, the drapers 10 and 30 will travel in the direction shown by arrow 51 and 52 respectively.

The cut grain and weeds will then be compressed between drapers 10 and 30 and carried to elevator 13.

It will be understood that the method of driving draper 10 and 30 is optional and that any suitable means may be employed to drive them in the correct direction and still come within the scope of my claims.

While I have herein shown and described one specific embodiment of my invention I do not wish to be limited thereto except for such limitations as the claims may import.

I claim:

1. In combination with a harvesting machine platform draper, a draper frame supported above said platform, a secondary draper mounted within said frame and extending the full length of said platform, said secondary draper lying in a plane substantially parallel with the plane of said platform, cleats secured to said secondary draper, and clips mounted on said cleats, said clips extending over and engaging said draper frame for scraping said frame and causing material cast on the upper face of said secondary draper to be carried to and dumped on said platform.

2. In combination with a harvesting machine platform draper, a draper frame supported above said platform, a secondary draper mounted within said frame and superposing said platform draper, cleats secured to said secondary draper and clips mounted on said cleats, said clips extending over and engaging said draper frame.

3. In combination with a harvesting machine platform draper, a reel positioned above and extending in front of said platform draper, a screen support, a screen carried by said support and disposed at the rear of said draper, a cutter bar extending along the front of said draper, a draper frame secured to said support, a secondary draper positioned in superposed relation with said platform draper, for causing that grain cut by said cutter bar and thrust against said screen by said reel to be compressed between said platform draper and said secondary draper, cleats secured to said secondary draper, and clips mounted on said cleats, said clips extending over and engaging said draper frame for cleaning said frame and causing material cast on the upper face of said secondary draper to be carried to and dumped on said platform.

In testimony whereof I hereby affix my signature in the presence of two witnesses.

ELMER C. WOODWARD.

Witnesses:
H. M. GENIN,
M. LOWNEY.

Copies of this patent may be obtained for five cents each, by addressing the "Commissioner of Patents, Washington, D. C."